United States Patent Office 3,054,826
Patented Sept. 18, 1962

3,054,826
PROCESS FOR PREPARING PEROXIDES
Klaus Weissermel and Michael Lederer, Frankfurt am Main, Germany, assignors to Farbwerke Hoechst Aktiengesellschaft vormals Meister Lucius & Bruning, Frankfurt am Main, Germany, a corporation of Germany
No Drawing. Filed Jan. 23, 1959, Ser. No. 788,487
Claims priority, application Germany Aug. 23, 1956
14 Claims. (Cl. 260—610)

This invention relates to a process for preparing peroxides. It is known that hydroperoxides can be added to the carbon double bond of $\alpha,\beta$-unsaturated nitriles under the action of an alkali.

$\alpha,\beta$-unsaturated ketones, acids and nitro-compounds react with peroxides in the same manner.

It is furthermore known to prepare $\alpha$-halogeno-alkyl hydroperoxides by the coupled oxidation of alkyl halides and hydrogen bromide. Said process involves, however, the disadvantage that it is limited to the use of derivatives of isoparaffins and it is thus only suitable for the manufacture of tertiary hydroperoxides.

Now we have found that hydrogen peroxide and organic hydroperoxides can also be added to carbon-double bonds not activated by a polar substituent in a neighboring position to the double bond, this being surprising.

This invention is based on the observation that a compound corresponding to the general formula

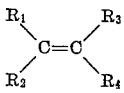

wherein the substituents $R_1$, $R_2$, $R_3$ and $R_4$ represent identical or different hydrocarbon radicals, such as alkyl (including cycloalkyl), aralkyl, aryl, or heterocyclic groups and at most three hydrogen radicals, may be reacted with hydrogen peroxide or an organic hydroperoxide corresponding to the general formula ROOH, wherein R represents an alkyl, aralkyl, cycloalkyl, or heterocyclic group containing 1–20 carbon atoms, and in which preferably an aliphatic carbon atom is bound to the oxygen, in the presence of a compound yielding positive halogen, such as hypohalites, and having the general formula $R_5OX$, wherein X stands for a halogen atom with an atomic weight of at least 35, especially chlorine and bromine, and $R_5$ stands for a normal or branched saturated alkyl group containing 1–20 carbon atoms, preferably tertiary alkyl groups contaning 4–10 carbon atoms. In this latter formula the substituent $R_5$ may also represent an aromatic, especially a substituted aromatic or a combined radical formed by the aforesaid groups and aralkyl. The term alkyl as used herein comprises straight and branched and cycloaliphatic radicals.

The reaction proceeds according to the following equation:

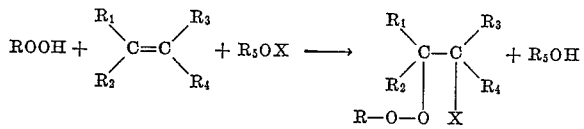

As olefins there may be used in this invention alkenes, aralkenes, cycloalkenes and condensed cycloalkenes containing 3–20 carbon atoms and preferably 3–20 carbon atoms, provided they are liquid under the reaction conditions, for example butene, pentene, methylpentene, n-hexene, n-heptene, styrene, $\alpha$-methylstyrene, cyclohexene, methylcyclohexene and indene.

Suitable peroxides are hydrogen peroxide, alkylhydroperoxides, and preferably a hydroperoxide of the following formula

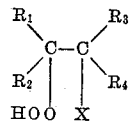

wherein the substituents have the aforsaid meanings, such as ethyl hydroperoxide, propyl hydroperoxide, isopropyl hydroperoxide, butyl hydroperoxide, tertiary butyl hydroperoxide, tertiary amyl hydroperoxide, n-octane hydroperoxide, methyl-heptane hydroperoxide, 2-chloro-2-methylpentane hydroperoxide-3, 4-chloro-isoheptane hydroperoxide-3, cyclic peroxides, such as methylcyclopentane hydroperoxide, cyclohexane hydroperoxide, o-chlorocyclohexane hydroperoxide, condensed cyclic hydroperoxides, such as decahydronaphthalene hydroperoxide, tetrahydronaphthalene hydroperoxide, indane hydroperoxide, and hydroperoxides containing aromatic radicals in the molecule, such as cumene hydroperoxide, paramenthane hydroperoxide, diphenylmethane hydroperoxide; there may also be used hydroperoxides containing heterocyclic radicals, such as tetrahydrofurane hydroperoxide, tetrahydropyrane hydroperoxide and 2-methyl-dihydrofurane hydroperoxide.

As compounds yielding positive halogen there may especially be used those which dissolve homogeneously in the reaction medium, for example hypohalites, and in which the halogen is preferably chlorine or bromine and in which the organic radical is a primary, secondary or tertiary alkyl group, such as the methyl, ethyl, propyl, butyl, sec. butyl, tert. butyl, or tert. amyl group. There may also be used hypohalites containing aromatic, especially substituted aromatic radicals and cycloaliphatic radicals. It is preferred to use hypohalites in which the hypohalite group is attached to a tertiary carbon atom, because this type of compounds is especially stable and readily available. Representatives of these hypohalites are, for example, tertiary butyl hypochlorite, tertiary butyl hypobromite, tertiary amyl hypochloride, tertiary amyl hypobromite, 2.4.6-trichlorophenyl hypobromite and 1-methyl-cyclohexyl hypochlorite-1.

The addition of organic hydroperoxides or hydrogen peroxide to olefins in the presence of a hypohalite proceeds very rapidly with a good heat effect and is preferably achieved at a temperature between $-30°$ C. and $+50°$ C., advantageously $-20°$ C.–$+50°$ C. Depending on the reactivity and liability to decomposition of the reaction components, a higher or lower temperature may be applied, if desired. The reaction velocity is, however, reduced at a temperature of below $-60°$ C. and a temperature above $80°$ C. requires the use of very stable reactants.

The hydrogen peroxide necessary in the process of the present modification can be used in pure, undiluted form or in a dilute organic solution. Suitable solvents are, for example, diethyl ether, diisopropyl ether, tetrahydrofurane and dioxane. It is furthermore possible to use the hydrogen peroxide in the form of its addition compounds with urea or silicium dioxide.

By the process of the present invention organic hydroperoxides and peroxides can be obtained. For the preparation of organic hydroperoxides by the process of the present invention it is of advantage to charge the reaction vessel first with hydrogen peroxide and to add subsequently the olefin to be used and the organic hypohalite, either individually or in admixture, if desired in the presence of an inert solvent, and with the exclusion of moisture. If, however, an organic peroxide is to be prepared, it is necessary to use the olefinic component in at least a stoichiometric proportion, advantageously in excess. In this case it is of advantage to add the hypohalite gradually, while stirring, to the olefinic component and an organic hydroperoxide, in the presence or absence of a solvent which does not participate in the reaction, and in the presence of a small amount of a weakly basic agent, such as sodium bicarbonate.

Suitable solvents are, for example, liquid hydrocarbons, such as pentane, hexane, cyclohexane, octane; ethers, such as diethyl ether, dioxane, and halogenated hydrocarbons, preferably perhalogenated hydrocarbons, provided they are liquid under the reaction conditions used, for example, carbon tetrachloride, tetrafluorodichlorethane, and trifluorotrichlorethane.

The reaction conditions used neither promote a polymerization of the olefin component nor a decomposition of the hydroperoxide. The reaction products obtained may be finished and isolated according to methods known per se.

It is of advantage to separate and isolate the organic hydroperoxides via their sodium salts. The neutral peroxides then remain dissolved in the organic phase and can be obtained by fractional distillation.

The reaction of hydroperoxides with olefins in the presence of organic hypohalites in a one stage process leads to novel halogenated organic hydroperoxides and peroxides which are useful as polymerization and hardening catalysts, for example in vinyl acetate and unsaturated polyester resins.

The following examples serve to illustrate the invention but they are not intended to limit it thereto, the parts being by weight unless otherwise stated.

Example 1

56 grams of n-pentene-2 and 51 grams of tertiary butyl hydroperoxide were cooled with exclusion of moisture to −15° to −20° C. in a reaction vessel provided with a stirrer and a dropping funnel. 61 grams of tertiary butyl hypochlorite were then added dropwise within 8 hours, while stirring. The whole was heated to room temperature and the reaction mixture was fractionated. The addition product obtained distilled over at a temperature of between 33° and 37° C. under a pressure of 0.09 mm. of mercury. $n_D^{20}=1.4277$.

Analysis $C_9H_{19}O_2Cl$:

|  | molecular weight | C | H | Cl | O-active |
|---|---|---|---|---|---|
| calculated | 166.7 | 50.5 | 9.1 | 21.3 | 9.6 |
| found | 173 | 50.6 | 9.3 | 21.6 | 8.9 |

The peroxide obtained could be used, for example, in the polymerization of vinyl acetate. To this end, 100 parts of vinyl acetate were bulk polymerized at 80° C. with 1 part of the above peroxide. The polymer was obtained in a yield of 96%. A 1% solution of this polymer in ethyl acetate, at 20° C., had a specific viscosity of 2.4.

Example 2

70 grams of cyclohexene and 40 grams of tertiary butyl hydroperoxide were reacted as described in Example 1 within 10–12 hours at −17° to −20° C. with 37 grams of tertiary butyl hydochlorite. The slightly yellow solution was then fractionated in vacuo. The addition product obtained distilled over at a temperature of between 39 and 41° C. under a pressure of 0.01 mm. of mercury. $n_D^{20}=1.4618$.

Analysis:

Summation formula: $C_{10}H_{19}O_2Cl$
Molecular weight: 206.5

|  | C | H | Cl | O-active |
|---|---|---|---|---|
| calculated | 58.1 | 9.2 | 17.2 | 15.5 |
| found | 57.8 | 8.9 | 17.2 | 16.1 |

Example 3

A round-bottomed flask provided with reflux condenser and dropping funnel is charged, with the exclusion of moisture, with 75 cm.³ of n-heptene-3 and 142 cm.³ of an ethereal solution of hydrogen peroxide of 8.3% strength by volume are added at a temperature of −10° C. Then 54 grams of tertiary butyl-hypochlorite are added dropwise while stirring. The reaction takes place with a weak evolution of heat. The temperature is maintained at 20° to 25° C. When the reaction is complete, the unreacted tertiary butyl-hypochlorite is reduced with a 1/10 N sodium thiosulfate solution. The reaction product is then washed with saturated sodium bicarbonate solution and three times with water. After having dried the ethereal solution with anhydrous sodium sulfate, the readily volatile portions are distilled off under reduced pressure. The yield amounts to 40 grams. A sample is subjected to fractional distillation, whereby the addition product of olefin, hydrogen peroxide and butyl hypochlorite distils over at 58–60° C. and under a pressure of 2 mm. of mercury. $n_D^{20}=1.4515$.

Analysis:

Summation formula: $C_7H_{15}O_2Cl$

|  | molecular weight | C | H | Cl | O-active |
|---|---|---|---|---|---|
| calculated | 166.7 | 50.5 | 9.1 | 21.3 | 9.6 |
| found | 173 | 50.6 | 9.3 | 21.6 | 8.9 |

Example 4

A round-bottomed flask provided with reflux condenser and dropping funnel is charged with 94 cm.³ of an ethereal solution of hydrogen peroxide of 14.65% strength by volume and a mixture of 39 grams of 2-methyl-pentene-1 and 56 grams of tertiary butyl-hypochlorite is dropped in while stirring at a temperature of 10 to 15° C.

For the destruction of the hypohalite in excess the reaction solution is subsequently treated with a 1/10 N sodium thiosulfate solution, then washed with a saturated sodium bicarbonate solution and finally with water and dried over anhydrous sodium sulfate. After having distilled off the readily volatile portions 45 grams of crude organic peroxide are obtained.

On fractionating a sample the organic peroxide distils at 36.5° C. and under a pressure of 1.5 mm. of mercury. $n_D^{20}=1.4511$.

Analysis:

Summation formula: $C_6H_{13}O_2Cl$

|  | Molecular weight | C | H | Cl | O-active |
|---|---|---|---|---|---|
| Calculated | 152.6 | 47.2 | 8.6 | 23.8 | 10.5 |
| Found | 161 | 47.0 | 8.7 | 22.8 | 10.0 |

Example 5

A round-bottomed flask provided with reflux condenser and dropping funnel is charged with 50 grams of cyclohexene and 150 cm.³ of an ethereal solution of hydrogen peroxide of 7.9% strength by volume. 54 grams of tertiary butyl hypochlorite are dropped in at a temperature in the range from 0 to 5° C. The reaction solution is then diluted with 50 cm.³ of ether, washed with saturated sodium bicarbonate solution and water and dried over anhydrous sodium sulfate.

After having eliminated the readily volatile portions by a distillation under reduced pressure, 40 grams of crude organic peroxide are obtained.

When subjecting a sample of the crude product to a fractional distillation the reaction product passes over at 61° C. and under a pressure of 1.5 mm. of mercury. $n_D^{20}=1.4885$.

Analysis:

Summation formula: $C_6H_{11}O_2Cl$

|  | Molecular weight | C | H | Cl | O-active |
|---|---|---|---|---|---|
| calculated | 150.6 | 47.8 | 7.4 | 23.7 | 10.6 |
| found | 162 | 47.7 | 8.1 | 23.1 | 9.2 |

The distillation residue is taken up in pentane and the residual hydroperoxide is precipitated in the form of the sodium salt. After having washed the organic phase with water and dried over anhydrous sodium sulfate, it is concentrate under reduced pressure. On cooling there crystallizes the dichlorodicycloalkyl peroxide of the formula

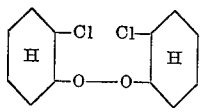

having a melting point of 57 to 59° C. when recrystallized from methanol.

Analysis:

Summation formula: $C_{12}H_{20}O_2Cl_2$

|  | C | H | Cl | O-active |
|---|---|---|---|---|
| calculated | 53.9 | 7.6 | 26.6 | 6.0 |
| found | 53.9 | 7.7 | 25.9 | 5.3 |

This application is a continuation-in-part application to U.S. patent application Ser. No. 677,841, filed on August 13, 1957, by Klaus Weissermel and Michael Lederer, now abandoned.

We claim:

1. A process for making halogenated organic peroxides which comprises contacting, at a temperature between —30° C. and 50° C., an olefin of the formula

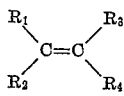

with a peroxide of the formula ROOH in the presence of a hypohalite of the formula $R_5OX$, wherein $R_1$, $R_2$, $R_3$, and $R_4$ are at least one member selected from the group consisting of hydrocarbon radicals and hydrogen and where at most three of the radicals $R_1$—$R_4$ are hydrogen, $R_5$ is a hydrocarbon radical of at most 20 carbon atoms, X is a halogen atom having an atomic weight between 35 and 127, and R is a radical selected from the group consisting of hydrogen, hydrocarbon radicals, heterocyclic radicals having 4 to 5 cyclic carbon atoms and a single oxygen atom as the only hetero atom in the heterocycle, and

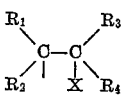

wherein $R_1$—$R_4$ and X have their earlier meaning, whereby the groups —X and —OOR are added to the double bond of said olefin, and then separating the organic peroxide so produce from the reaction mixture.

2. A process as claimed in claim 1, wherein a hydroperoxide is used in the reaction in which R stands for a substituent having the general formula

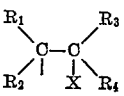

$R_1$, $R_2$, $R_3$, $R_4$ and X having the meanings given in claim 1.

3. A process as claimed in claim 1, wherein an olefin is used which contains from 3–20 carbon atoms.

4. A process as claimed in claim 1, wherein hypohalites are used in which the hypohalite group is bound to a tertiary carbon atom.

5. A process as claimed in claim 1, wherein a hypochlorite is used.

6. A process as claimed in claim 1, wherein the reaction is carried out at a temperature in the range from —30° C. to +50° C.

7. A process as claimed in claim 1, wherein the reaction is carried out in a solvent inert towards the reaction.

8. A process for making monohalogenated organic peroxides which comprises contacting, at a temperature between —30° C. and 50° C., an olefin having 3–20 carbon atoms with an organic hydroperoxide of the formula ROOH, where R is an alkyl group having 1–20 carbon atoms, in the absence of water and in the presence of an organic hypohalite of the formula $R_1OX$, wherein $R_1$ is a saturated hydrocarbon radical having 1–20 carbon atoms including a tertiary carbon atom to which the hypohalite group is bound, and X is a halogen atom having an atomic weight between 35 and 127, whereby the groups —OOR and —X are added to the double bond of said olefin, and then separating the organic peroxide so produced from the olefin.

9. A peroxide of the formula

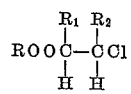

wherein $R_1$ and $R_2$ are members of the group consisting of hydrogen, lower alkyl radicals, and, taken jointly with the carbon atoms to which they are attached, cyclohexylene, at most one of $R_1$ and $R_2$ being hydrogen, and R is a member of the group consisting of hydrogen and tertiary-butyl and monochlorocyclohexyl radicals.

10. o-Chloro-cyclohexyl peroxide.
11. o,o'-Dichloro-dicyclohexyl peroxide.
12. o-Chloro-cyclohexyl tertiary-butyl peroxide.
13. A mixture of peroxides having the formulas

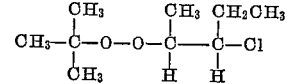

and

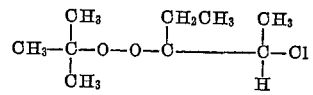

14. A mixture of peroxides having the formulas

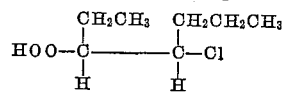

and

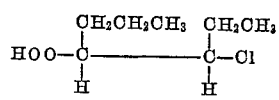

References Cited in the file of this patent

UNITED STATES PATENTS

| 2,207,983 | Harford | July 16, 1940 |
| 2,403,771 | Vaughn et al. | July 9, 1946 |
| 2,446,797 | Vaughn et al. | Aug. 10, 1948 |
| 2,508,256 | Harman | May 16, 1950 |